US009385856B2

(12) United States Patent
Ji et al.

(10) Patent No.: US 9,385,856 B2
(45) Date of Patent: Jul. 5, 2016

(54) METHOD AND APPARATUS FOR TRANSMITTING AND RECEIVING FRAME CONFIGURATION INFORMATION IN TDD WIRELESS COMMUNICATION SYSTEM

(71) Applicant: Samsung Electronics Co., Ltd., Gyeonggi-do (KR)

(72) Inventors: Hyoung-Ju Ji, Seoul (KR); Joon-Young Cho, Gyeonggi-do (KR); Seung-Hoon Choi, Suwon-si (KR); Young-Bum Kim, Seoul (KR); Sang-Min Ro, Seoul (KR)

(73) Assignee: Samsung Electronics Co., Ltd (KR)

( * ) Notice: Subject to any disclaimer, the term of this patent is extended or adjusted under 35 U.S.C. 154(b) by 249 days.

(21) Appl. No.: 13/891,919

(22) Filed: May 10, 2013

(65) Prior Publication Data

US 2013/0301492 A1 Nov. 14, 2013

Related U.S. Application Data

(60) Provisional application No. 61/645,221, filed on May 10, 2012.

(51) Int. Cl.
*H04J 3/00* (2006.01)
*H04L 5/14* (2006.01)
*H04W 72/04* (2009.01)
*H04L 5/00* (2006.01)

(52) U.S. Cl.
CPC .............. *H04L 5/14* (2013.01); *H04L 5/0096* (2013.01); *H04L 5/1469* (2013.01); *H04W 72/042* (2013.01); *H04L 5/0007* (2013.01); *H04L 5/0044* (2013.01)

(58) Field of Classification Search
USPC .............. 370/252–294, 312–329, 337–347, 370/280–312, 329–336; 455/422–452
See application file for complete search history.

(56) References Cited

U.S. PATENT DOCUMENTS 8,380,204 B2 * 2/2013 Choi ...................... H04W 48/12
455/435.2
8,705,556 B2 * 4/2014 Wang et al. ................... 370/431
(Continued)

FOREIGN PATENT DOCUMENTS

WO   WO 2010/086498   8/2010

OTHER PUBLICATIONS

Ritt, Catt, "OFDM Scheme for TDD EUTRA", R1-050648, 3GPP TSG-RAN WG1 Ad Hoc on LTE, Jun. 20-21, 2005.
(Continued)

*Primary Examiner* — Man Phan
(74) *Attorney, Agent, or Firm* — The Farrell Law Firm, P.C.

(57) ABSTRACT

A method and apparatus for transmitting Time Division Duplexing (TDD) configuration information by an evolved Node B (eNB) in a TDD wireless communication system are provided. The method includes determining a changed TDD configuration indicating a transmission direction of a plurality of sub-frames constituting a frame; generating a system information element including dynamic TDD configuration information indicating the changed TDD configuration; transmitting a system information block including the dynamic TDD configuration information; and sending a Media Access Control (MAC) message including information indicating whether a change in TDD configuration is activated.

16 Claims, 11 Drawing Sheets

(56) References Cited

U.S. PATENT DOCUMENTS

| | | | |
|---|---|---|---|
| 8,837,335 B2* | 9/2014 | Susitaival et al. | 370/294 |
| 8,923,274 B2* | 12/2014 | Wang et al. | 370/351 |
| 8,958,349 B2* | 2/2015 | Wang | H04W 72/04 370/280 |
| 8,977,271 B2* | 3/2015 | Choi | H04W 48/12 455/435.2 |
| 2006/0099987 A1* | 5/2006 | Singh | H04W 24/02 455/550.1 |
| 2010/0176461 A1 | 7/2010 | Sasagawa | |
| 2011/0176461 A1* | 7/2011 | Astely | H04B 7/2656 370/280 |
| 2011/0211552 A1 | 9/2011 | Choi et al. | |
| 2012/0082101 A1 | 4/2012 | Gaal et al. | |
| 2012/0188901 A1* | 7/2012 | Struhsaker et al. | 370/252 |
| 2013/0194980 A1* | 8/2013 | Yin et al. | 370/280 |
| 2013/0258938 A1* | 10/2013 | Sagfors et al. | 370/312 |
| 2014/0016520 A1* | 1/2014 | Kim et al. | 370/280 |
| 2014/0036738 A1* | 2/2014 | Kim et al. | 370/280 |
| 2014/0233439 A1* | 8/2014 | Hong et al. | 370/280 |

OTHER PUBLICATIONS

Sharp, "FAST Uplink-Downlink Re-Configuration with Traffic Adaptation by PHY Layer Signaling", R1-112300, 3GPP TSG-RAN WG1 #66, Aug. 22-26, 2011.
LG Electronics, "Issues in Further Enhancments to LTE TDD", R1-121461, 3GPP TSG RAN WG1 Meeting #68bis, Mar. 26-30, 2012, 4 pages.
European Search Report dated Dec. 2, 2015 issued in counterpart application No. 13788537.2-1851, 9 pages.

* cited by examiner

METHOD AND APPARATUS FOR TRANSMITTING AND RECEIVING FRAME CONFIGURATION INFORMATION IN TDD WIRELESS COMMUNICATION SYSTEM

PRIORITY

This application claims the benefit under 35 U.S.C. §119(a) of a United States (U.S.) provisional patent application filed in the U.S. Patent and Trademark Office on May 10, 2012 and assigned Ser. No. 61/645,221, the entire disclosure of which is incorporated herein by reference.

BACKGROUND OF THE INVENTION

1. Field of the Invention

The present invention relates generally to a method and apparatus for transmitting and receiving system information related to the configuration of a frame in a Time Division Duplexing (TDD) wireless communication system.

2. Description of the Related Art

Wireless communication systems, which provided voice-driven services in their early stages, have developed into high-speed, high-quality wireless packet data communication systems to provide data services and multimedia services. As these wireless communication systems, a variety of wireless communication systems, such as High Speed Downlink Packet Access (HSDPA), High Speed Uplink Packet Access (HSUPA) and Long Term Evolution (LTE) proposed by 3rd Generation Partnership Project (3GPP), including the Code Division Multiple Access (CDMA) network that was providing $2^{nd}$ Generation (2G) mobile communication services in the past, have recently been developed to support high-speed, high-quality wireless packet data transmission services.

The LTE system is a typical high-speed packet data system, to which multi-carrier Orthogonal Frequency Division Multiplexing (OFDM) is applied in a Downlink (DL) and Single Carrier-Frequency Division Multiple Access (SC-FDMA) is applied in an Uplink (UL). The LTE system may have the configuration of Frequency Division Duplexing (FDD) and TDD systems. In the FDD system, a DL and a UL use different frequency bands for their transmission, and an evolved Node B (eNB) (or a Base Station (BS) in the CDMA system) and a User Equipment (UE) (or a Mobile Station (MS) in the CDMA system) perform transmission and reception at the same time. In the TDD system, a DL and a UL use the same frequency band for their transmission, and an eNB and a UE cannot perform transmission and reception at the same time. Therefore, the TDD system uses a method in which a UE and an eNB agree on their transmission and reception times in advance and transmit data at predetermined times.

The FDD system has two frequencies, and uses one of them for a frequency band for DL transmission and the other one for a frequency band for UL transmission. The TDD system has only one frequency band, divides the one frequency band in the time axis, and performs DL transmission at arbitrary times and UL transmission at other times.

In the TDD system, UL transmission and DL transmission are performed in accordance with predetermined rules. The LTE system has a total of, for example, 7 kinds of TDD radio frame configurations (hereinafter, referred to as 'TDD configurations' for short), and once determined by the system, the TDD configurations are not likely to be changed. In the case of TDD, if cells have different frame configurations, their transmission/reception may fail due to interference. Therefore, all cells in a specific area have the same TDD configuration and are synchronized with each other, so UL and DL transmissions may be performed at the same time.

In the LTE system, both TDD and FDD sub-frames have a length of 1 ms in the time axis, and have the full-LTE transmission bandwidth (BW) in the frequency axis. A sub-frame is divided into two slots along the time axis. In the LTE system, a transmission bandwidth includes a plurality of Resource Blocks (RBs), and each RB is used as a basic unit for resource allocation. Each RB may include 12 tones arranged in the frequency axis and 14 OFDM symbols arranged in the time axis. This sub-frame includes a control channel region for carrying control channels and a data channel region for carrying data channels. A Reference Signal (RS) for channel estimation is inserted into the control channel region and the data channel region.

The LTE system, to which TDD is applied, may not cope with the dynamically changing amount of UL/DL data, because once determined, the TDD configuration may not be changed in a short period of time. In other words, even though a large amount of UL data is generated for a certain period of time, the system may not use a DL sub-frame in a UL interval, for UL transmission. Many studies have been made to solve these problems.

As described above, the existing wireless communication system, to which TDD is applied, may not transmit Uplink (UL) data using a Downlink (DL) sub-frame even if a large amount of UL data is generated in a UL interval. This situation may occur frequently in a wireless communication environment where a large number of cells are hierarchically configured.

FIG. 1 illustrates an example of a conventional wireless communication system In FIG. 1 the wireless communication system has a communication environment in which macro cells and pico cells are arranged hierarchically, and the wireless communication system performs TDD communication.

Referring to FIG. 1, reference numeral 101 represents macro cells, and reference numeral 102 represents pico cells. The pico cells 102 generally transmit data with less power, compared to the macro cells 101, and are installed in the area(s) where there is a request for a large amount of data traffic from the macro cells 101. The area where there is a request for a large amount of data traffic may mean that the request for data traffic may significantly and dynamically change with the passage of time. For example, if a plurality of users perform DL data reception and Voice-over Internet Protocol (VoIP) transmission/reception, a UE needs to transmit a specific amount of UL data while receiving a large amount of DL data.

Therefore, the communication system illustrated in FIG. 1 may configure a TDD radio frame (hereinafter, referred to as a 'TDD frame' for short) so as to use most sub-frames for a DL and use a smaller number of sub-frames for UL transmission. However, if a UE needs to transmit a large amount of data to an eNB at a specific time or if there is a large amount of UL VoIP data to transmit, the UE may instantly request a large amount of UL resources from the eNB. The common TDD system, however, may not appropriately accept this UE's request for UL resources, because the common TDD system is designed such that eNBs connected to the same network may have the same TDD configuration, in order to prevent interference caused by collision of UL transmission and DL transmission between an eNB and a UE, or between neighbor eNBs. Furthermore, in the TDD system, each eNB needs to independently change its TDD configuration in order to adaptively cope with the variable amount of data traffic, which causes interference, making it impossible to actually transmit data.

FIG. 2 illustrates an example of a frame configuration in a conventional TDD-LTE system.

Referring to FIG. 2, generally, in the TDD-LTE system, one radio frame 201 has a length of 10 ms, and includes two half radio frames 202 each having a length of 5 ms. One half radio frame 202 includes 5 sub-frames 203. In other words, one radio frame 201 includes 10 sub-frames 203, and each sub-frame 203 has a length of 1 ms. The 10 sub-frames 203 may have various combinations of sub-frames for DL and UL transmission in accordance with 7 kinds of TDD configurations supported by the LTE system. An example of the TDD configurations is illustrated in Table 1 below. The TDD configurations in Table 1 are merely illustrative, and in the LTE system, the TDD configurations may have a variety of different forms.

TABLE 1

| Uplink-downlink configuration | Downlink-to-Uplink Switch-point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1 for a TDD configuration #0, its sub-frame indexes #0 and #5 are represented as 'D' and used for DL transmission, and its sub-frame indexes #2, #3, #4, #7, #8 and #9 are represented as 'U' and used for UL transmission. In the TDD configuration #0, its sub-frame indexes #1 and #6 are represented as 'S,' which indicates a special sub-frame 205. The special sub-frame 205 includes 3 regions of a DL pilot time slot (DwPTS), a guard period (GP), and an UL pilot time slot (UpPTS). The special sub-frame 205 functions as a switching point between a DL and a UL in TDD.

Due to its relative short UL interval, the special sub-frame 205 is used only for transmission of Physical Random Access CHannel (PRACH) and Sounding Reference Signal (SRS), and is not used for transmission of data or control channels. The GP is designed to ensure the time that an eNB needs in order to receive UL signals while transmitting DL signals.

As to TDD configuration information, Table 1 illustrates TDD configurations #0 to #6, each of which has a sub-frame (s) used to perform the same transmission at all times regardless of the TDD configuration. In the example of Table 1, the sub-frames #0, #1, #2 and #5 have the same sub-frame configuration at all times regardless of the kinds of TDD configurations. The sub-frames #3, #4, #6 and #7 may have different sub-frame configurations depending on the TDD configuration (i.e., depending on the kind of TDD configuration).

In a conventional LTE system, once a TDD configuration is determined (for example, one of the TDD configurations #0 to #6 in Table 1 is determined or selected), the determined TDD configuration is not changed by the amount of data traffic, and if the TDD configuration is changed in disregard of TDD interference from neighbor cells, it takes a time of about 640 ms or more to change the TDD configuration. The time of 640 ms is the time it takes for a UE to update system information by receiving system change information transmitted by an eNB. A TDD system that can change the TDD configuration due to a change in system information in this way will be referred to as a dynamic TDD system.

UEs used in the conventional TDD-LTE system may be classified into a UE supporting the dynamic TDD system and a UE that does not support the dynamic TDD system. The UE that does not support the dynamic TDD system may not recognize or detect a change in TDD configuration, which is caused by a change in system information. Therefore, the UE that does not support the dynamic TDD system may not achieve UL data transmission and DL data reception due to the changed TDD configuration, and also may not determine whether the eNB operates the TDD configuration for a DL or for a UL, at the time that the UE performs channel measurement in a DL sub-frame. As a result, in the dynamic TDD system, the eNB may not manage the UE that does not support the dynamic TDD system.

FIG. 3 illustrates an example of changing a TDD configuration using system information in a conventional TDD-LTE system.

Referring to FIG. 3, reference numeral 301 represents a frame interval, to which a TDD configuration A is applied, and reference numeral 303 represents a frame interval, to which a TDD configuration B is applied. In FIG. 3, the frame interval 301, to which the TDD configuration A is applied, has a relatively large amount of UL data, while the frame interval 303, to which the TDD configuration B is applied, has a relatively large amount of DL data. For UL and/or DL transmission, a UE and an eNB use frames 305 to which the TDD configuration A is applied, in the interval 301, and use frames 307 to which the TDD configuration B is applied, in the interval 303.

If it is expected that the amount of DL data will be greater than the amount of UL data, while using the frames 305 to which the TDD configuration A is applied, the eNB transmits system information to the UE at a time 309, the system information including TDD configuration information that is changed to change the TDD configuration from the TDD configuration A to the TDD configuration B. The UE receives the system information including the changed TDD configuration information, and changes the TDD configuration accordingly. In this case, since the changed TDD configuration has UL/DL transmission timing different from that of the previous TDD configuration, all UEs, which have received the changed TDD configuration information at the time 309, stop the transmission to which the TDD configuration A is applied, and start transmission to which the TDD configuration B is applied, depending on the changed TDD configuration information.

FIG. 4 illustrates a method for changing system information including TDD configuration information in a conventional TDD-LTE system.

Referring to FIG. 4, an interval which is shaded, as represented by reference numeral 401, is an interval where System Information Block 1 (SIB1) in system information is transmitted, and an interval which is hatched as shown by reference numeral 403 is an interval where SIB is transmitted, whose transmission period is different from that of SIB1. Reference numeral 405 represents a modification period (or change period) of the system information.

In the conventional LTE system, the system information that an eNB transmits to a UE, includes a System Information Block (SIB). With respect to the SIB, there are a plurality of different SIBs starting from, for example, SIB1, and the SIBs include different system information. The SIBs are different from each other in terms of the transmission time and period. SIB1 is transmitted at intervals of 80 ms, and retransmitted at intervals of 20 ms. For the other SIBs, the system determines their transmission time at intervals of a multiple of 80 ms. Upon receiving system information from the eNB, the UE maintains the received system information until the system information is changed.

If there is a change/update in the system information, the UE may receive a system information change indicator or SIB change indicator 407 over a paging channel 409 transmitted by the eNB. The SIB change indicator 407 may be transmitted as, for example, single-bit information. The SIB change indicator 407 indicates the presence of a change in system information if its value is '1', and indicates the absence of a change in system information if its value is '0'. In the example of FIG. 4, the UE may determine whether the system information is changed or not, based on the SIB change indicator 407 received from the paging channel 409. Upon detecting the presence of a change in system information based on the paging channel 409, the UE receives, for example, a changed SIB1 in a modification period 411 for system information 413, which follows the modification period in which the UE received the paging channel 409, and then sequentially changes the rest of the system information, if necessary.

In the conventional LTE system, TDD configuration information is included in SIB1 information. If an eNB changes TDD configuration information, the eNB indicates a change in system information using a paging channel 409 in the same way, and a UE receives a changed SIB1 415 in the next system information modification period, and may receive changed TDD configuration information 417 from the changed SIB1 415. The SIB1 415 has a change tag (not shown) for system information, and the change tag may be set such that, for example, 31 changes are possible in a period of 3 hours. Based on the change in the change/update tag, the UE may detect a change in system information. The system information may be changed once in every system information modification period 411 in the fastest case, but due to the constraints that a total of 31 changes are possible in 3 hours, the system information may be changed once every 5 minutes on average. The UE updates 419 the previously received SIB1 using the changed SIB1 415.

However, in the LTE system, the above-described existing system information changing method is limited to be applied to the dynamic TDD system, and all UEs need to change the system information. However, since the existing UE that does not support the dynamic TDD system cannot detect the change in system information, an error may occur between the TDD configuration changed by the eNB and the TDD configuration used by the UE, making the data transmission difficult. In addition, if an error occurs during reception of system information, this problem becomes more serious.

SUMMARY OF THE INVENTION

The present invention is to address at least the above-mentioned problems and/or disadvantages occurring in the prior art and to provide at least the advantages described below.

Accordingly, an aspect of the present invention is to provide a method and apparatus for efficiently transmitting and receiving configuration information of a TDD frame in a wireless communication system.

Another aspect of the present invention is to provide a method and apparatus for efficiently transmitting and receiving changed configuration information if there is a change in configuration information of a TDD frame in a wireless communication system.

In accordance with an aspect of the present invention, there is provided a method for transmitting TDD configuration information by an eNB in a TDD wireless communication system. The method includes determining a changed TDD configuration indicating a transmission direction of a plurality of sub-frames constituting a frame; generating a system information element including dynamic TDD configuration information indicating the changed TDD configuration; transmitting a system information block including the dynamic TDD configuration information; and sending a Media Access Control (MAC) message including information indicating whether a change in TDD configuration is activated.

In accordance with another aspect of the present invention, there is provided an eNB for transmitting TDD configuration information in a TDD wireless communication system. The eNB includes a transceiver for transmitting and receiving TDD configuration-related information and a frame; and a controller for determining a changed TDD configuration indicating a transmission direction of a plurality of sub-frames constituting the frame, generating a system information element including dynamic TDD configuration information indicating the changed TDD configuration, transmitting a system information block including the dynamic TDD configuration information, and sending a MAC message including information indicating whether a change in TDD configuration is activated.

In accordance with another aspect of the present invention, there is provided a method for receiving TDD configuration information by a UE in a TDD wireless communication system. The method includes receiving, from an evolved Node B (eNB), a MAC message including information indicating whether a change in TDD configuration is activated; receiving a system information block including dynamic TDD configuration information; and receiving the dynamic TDD configuration information from the system information block, if the information in the MAC message indicates activation of the change in TDD configuration.

In accordance with yet another aspect of the present invention, there is provided a UE for receiving TDD configuration information in a TDD wireless communication system. The UE includes a transceiver for transmitting and receiving TDD configuration-related information and a frame; and a controller for receiving, from an eNB, a Media Access Control (MAC) message including information indicating whether a change in TDD configuration is activated, receiving a system information block including dynamic TDD configuration information, and receiving the dynamic TDD configuration information from the system information block, if the information in the MAC message indicates activation of the change in TDD configuration.

BRIEF DESCRIPTION OF THE DRAWINGS

The above and other aspects, features and advantages of certain embodiments of the present invention will be more apparent from the following description taken in conjunction with the accompanying drawings, in which.

DETAILED DESCRIPTION OF EMBODIMENTS OF THE PRESENT INVENTION

Figure 1:
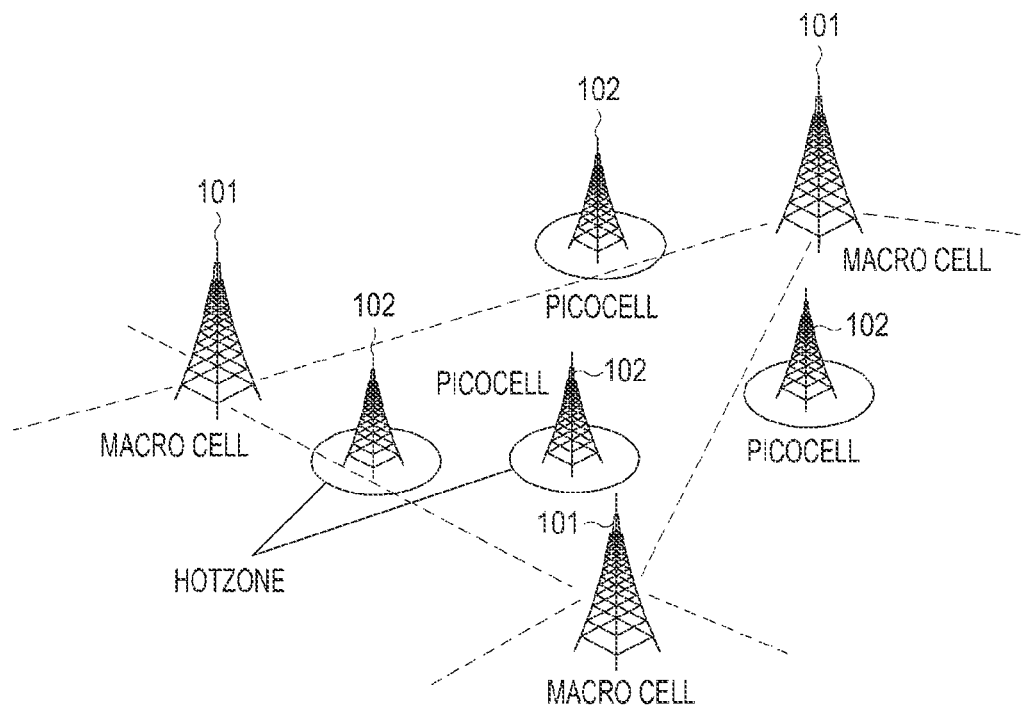
FIG. 1 illustrates an example of a conventional wireless communication system.
Figure 2:
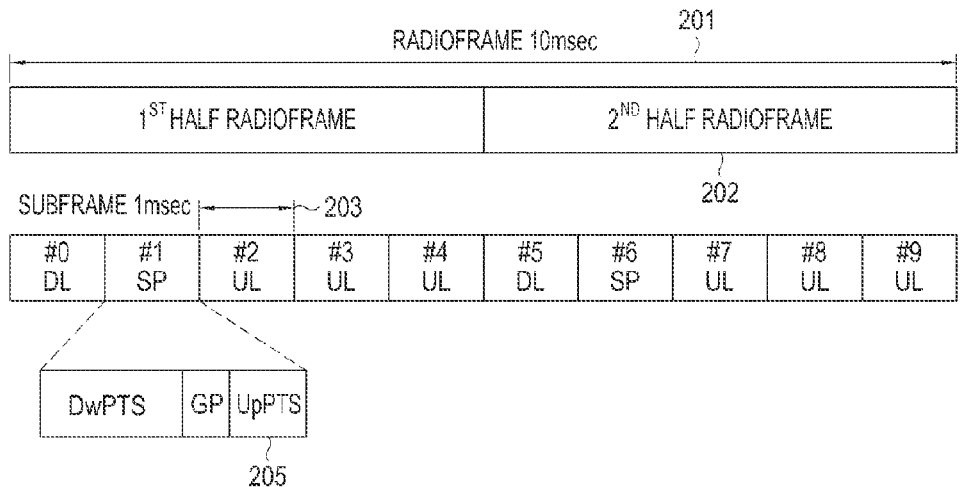
FIG. 2 illustrates an example of a frame configuration in a conventional TDD-LTE system.
Figure 3:
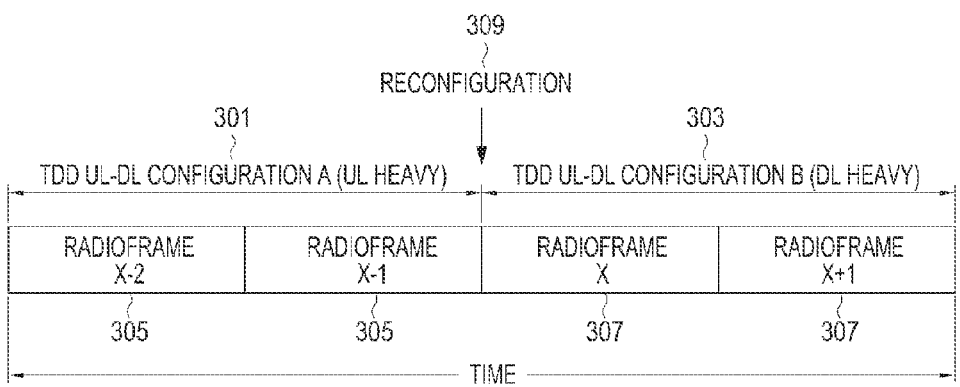
FIG. 3 illustrates an example of changing a TDD configuration using system information in a conventional TDD-LTE system.
Figure 4:
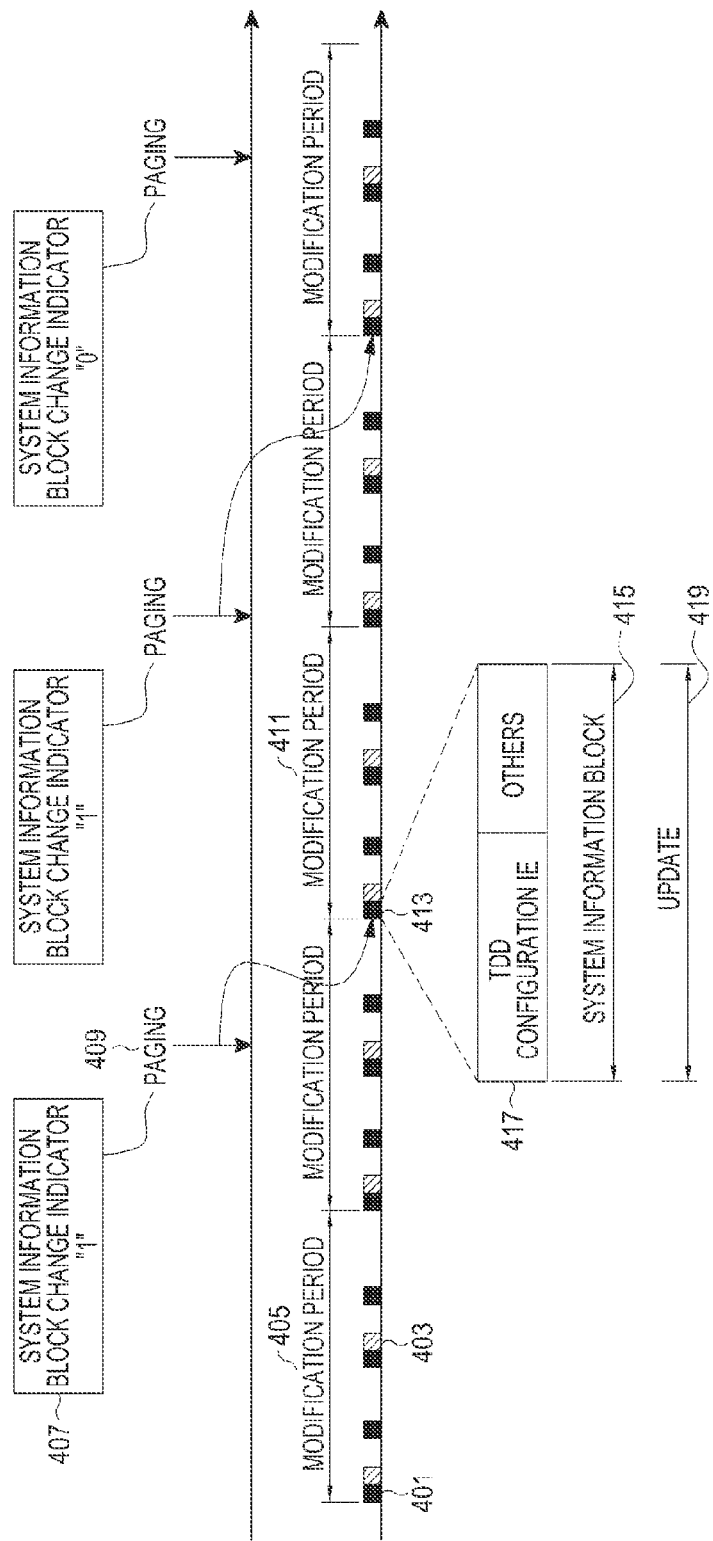
FIG. 4 illustrates a method for changing system information including TDD configuration information in a conventional TDD-LTE system.

The following description with reference to the accompanying drawings is provided to assist in a comprehensive understanding of various embodiments of the present invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness. Throughout the drawings, like reference numerals will be understood to refer to like parts, components, and structures.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

Embodiments of the present invention will be described below in connection with an LTE system, by way of example only. Embodiments of the present invention may also be applied to various TDD wireless communication systems, in which an eNB performs scheduling.

In a TDD-LTE system according to embodiments of the present invention, an existing UE that does not support dynamic TDD maintains the TDD configuration information included in the system information that the UE received during its initial access, and the UE supporting dynamic TDD should stably receive the dynamically-changed TDD configuration information, without interfering with the operation of the existing UE.

Figure 5:
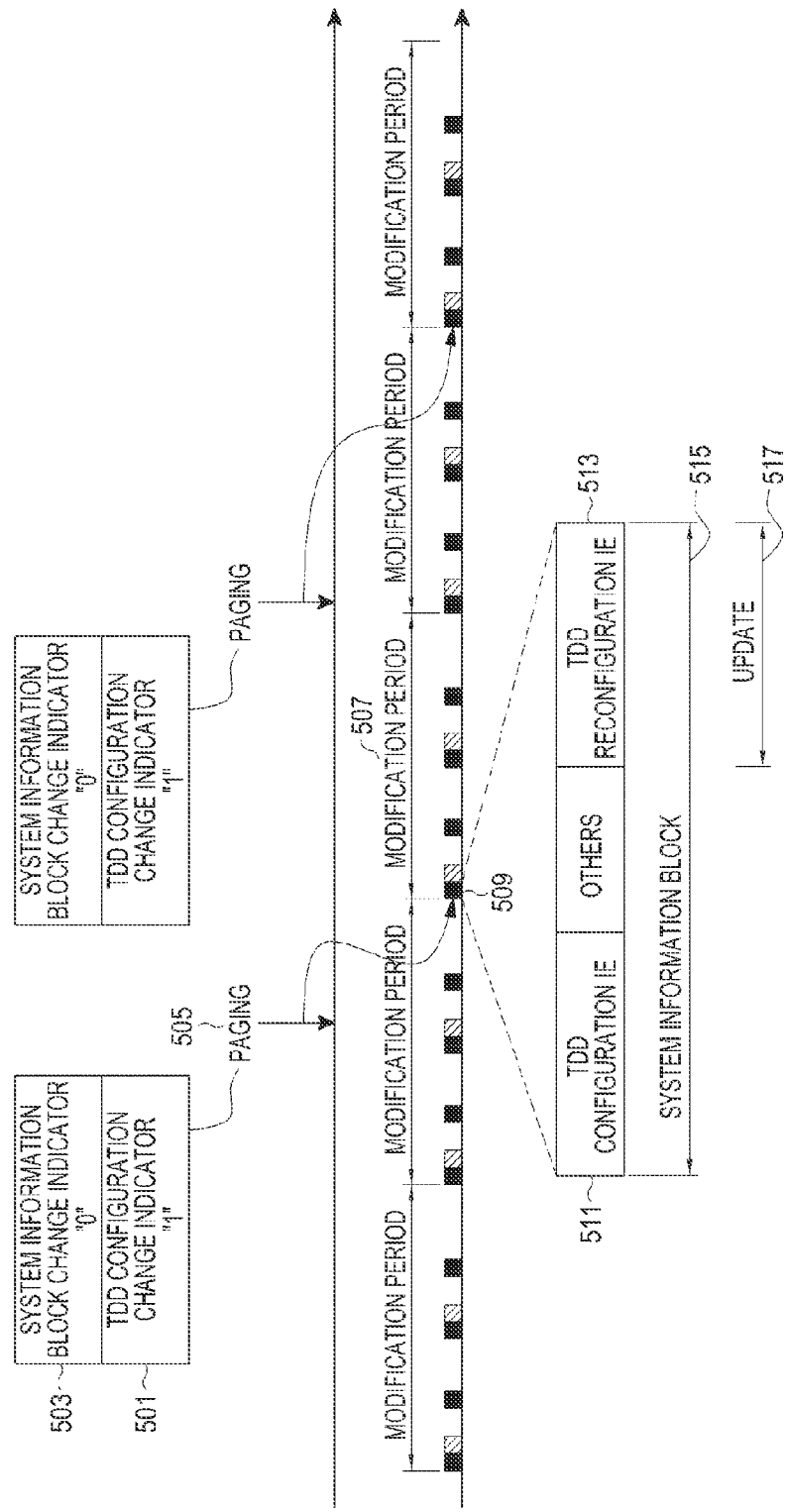
FIG. 5 illustrates a method for changing system information including TDD configuration information according to an embodiment of the present invention.

FIG. 5 illustrates a method for changing system information including TDD configuration information according to an embodiment of the present invention.

Referring to FIG. 5, an eNB transmits a TDD configuration change indicator 501, indicating whether TDD configuration is changed or not, to a UE over a paging channel 505. A change in system information or SIB is indicated by the TDD configuration change indicator 501. For example, the TDD configuration change indicator indicates the presence of a change in TDD configuration if its value is '1', and indicates the absence of a change in TDD configuration if its value is '0'. In FIG. 5, changed TDD configuration information includes a system information element or TDD reconfiguration information element (IE) 513 that only the UE capable of using or supporting the dynamic TDD system can recognize. The system information element 513 is included in a system information block 515 (for example, SIB1).

Upon receiving the TDD configuration change indicator 501 over the paging channel 505 and detecting the presence of a change in TDD configuration, the UE receives the system information block 515, and updates 517 only the system information element 513 including the changed TDD configuration information from the system information block 515. In the embodiment of the present invention, the UE incapable of recognizing the dynamic TDD system cannot detect even the presence/absence of indication for a change in TDD configuration of a paging channel, so the change in the system information is not performed or made in that UE.

In FIG. 5, even though the system information element 513 including dynamic TDD configuration information (i.e., changed TDD configuration information) is changed to new information, a system information change indicator or SIB change indicator 503 of the paging channel 505, a change tag of the existing system information block, and TDD configuration information or TDD configuration IE 511 of the system are not changed. Therefore, the existing UE that does not support the dynamic TDD system is not affected by the change in dynamic TDD configuration information regardless of whether a paging channel is received or not, or whether the UE is a newly accessing UE, and the UE capable of recognizing dynamic TDD configuration information can advantageously change the dynamic TDD configuration information to new TDD configuration information every time corresponding to the maximum paging period because it changes the dynamic TDD configuration information without a change in the change tag of the system information block.

In this embodiment, with regards to the time that the UE receives the system information block 515 after a change in TDD configuration information is indicated by the paging channel, the receiving includes both receiving the system information block 515 at the next modification period 507 of the system information, and receiving the system information block 515 at the reception time of the system information block 515, where it is transmitted earliest regardless of the next modification period 507.

A method of transmitting TDD configuration information (i.e., configuration information of a TDD frame) by an eNB in the TDD wireless communication system according to the embodiment, may be implemented as a method of determining a changed TDD configuration indicating a transmission direction (UL or DL) of a plurality of sub-frames constituting a frame, generating a system information element or TDD reconfiguration IE including changed TDD configuration information indicating the changed TDD configuration, transmitting a TDD configuration change indicator indicating whether TDD configuration information is changed or not, in a paging signal transmitted over a paging channel, and transmitting the changed TDD configuration information by inserting it into the existing system information block (SIB), if the TDD configuration is changed.

A method of receiving TDD configuration information by a UE in the TDD wireless communication system according to the embodiment, may be implemented as a method of receiving a TDD configuration change indicator, indicating whether TDD configuration information is changed or not, over a paging channel, receiving a system information block from an eNB if the TDD configuration change indicator indicates a change in TDD configuration, receiving a system information element including changed TDD configuration indicating a transmission direction of a sub-frame from the received system information block, and transmitting and receiving the sub-frame depending on the changed TDD configuration.

The system information element or TDD reconfiguration IE includes information that indicates one of the TDD frame configurations defined in, for example, Table 1, or indicates a transmission direction (UL or DL) of each sub-frame. The system information element is implemented such that only the UE capable of operating in the dynamic TDD system can recognize the system information element, and a UE capable of recognizing the system information element may demodulate the system information element within the existing system information block.

Figure 6:
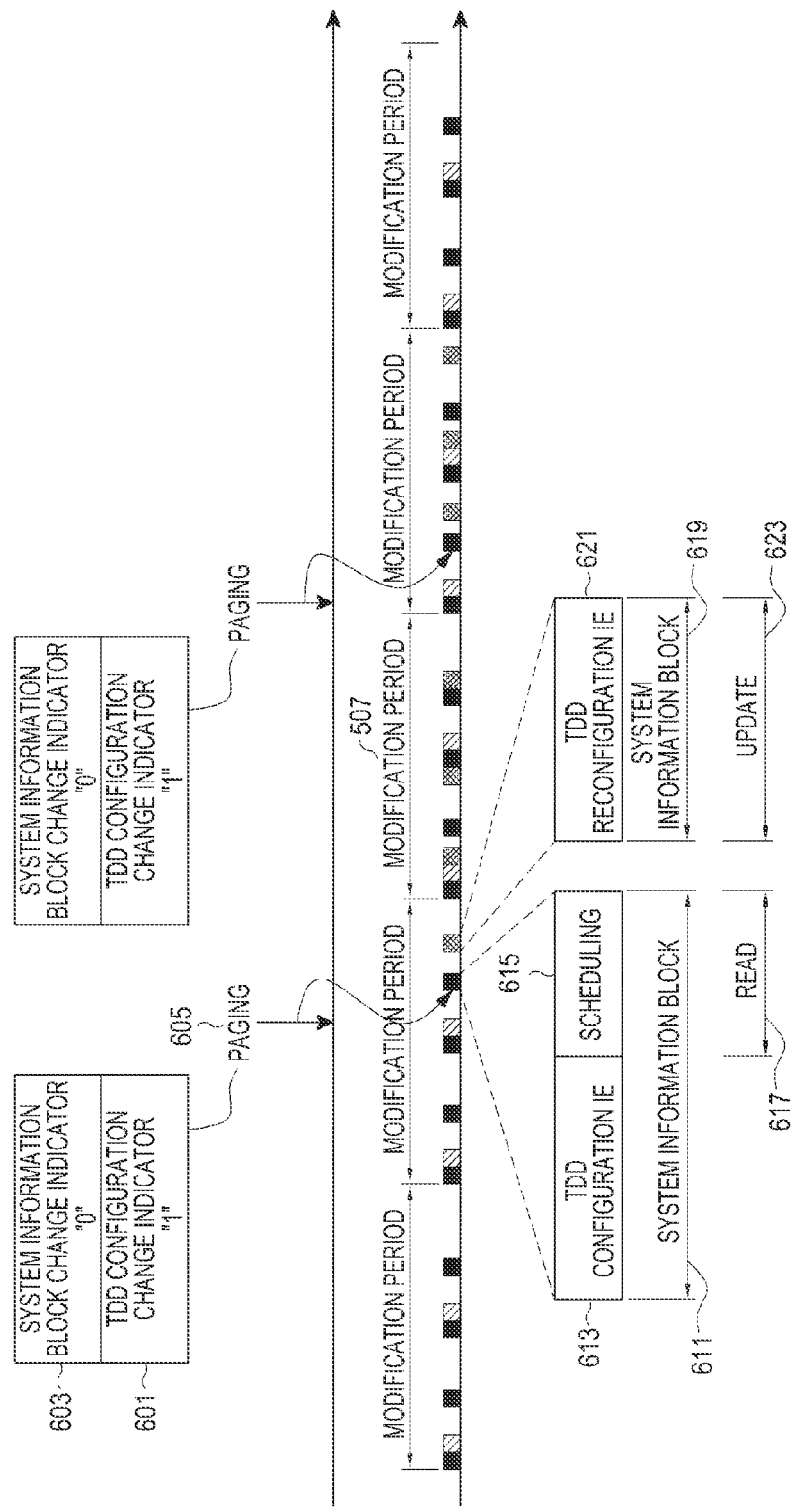
FIG. 6 illustrates a method for changing system information including TDD configuration information according to an embodiment of the present invention.

FIG. 6 illustrates a method for changing system information including TDD configuration information according to an embodiment of the present invention.

Referring to FIG. 6, an eNB transmits a TDD configuration change indicator 601 indicating whether TDD configuration is changed or not, to a UE over a paging channel 605. A change in system information or SIB is indicated by the TDD configuration change indicator 601. For example, the TDD configuration change indicator indicates the presence of a change in TDD configuration if its value is '1', and indicates the absence of a change in TDD configuration if its value is '0'. In the embodiment of FIG. 6, changed TDD configuration information includes a system information element or TDD reconfiguration IE 621 that only the UE capable of using or supporting the dynamic TDD system can recognize. The system information element 621 is included in a new system information block 619 instead of the existing system information block (for example, SIB1) 611. The existing system information block 611 includes scheduling information 615 for the new system information block 619.

Upon receiving the TDD configuration change indicator 601 over the paging channel 605 and detecting the presence of a change in TDD configuration, the UE receives the system information block 611, and reads 617 only the scheduling information 615 for the system information block 619 including changed TDD configuration information from the system information block 611. The system information block 611 includes the existing system information element or TDD configuration IE 613 that the UE incapable of using or supporting the dynamic TDD system can recognize. Upon receiving the scheduling information 615, the UE updates 623 only the system information element or TDD reconfiguration IE 621 including changed TDD configuration information from the system information block 619 that is scheduled by the scheduling information 615.

In FIG. 6, the UE incapable of using or supporting the dynamic TDD system cannot detect even the presence/absence of indication for a change in TDD configuration of the paging channel 605, so the change in the system information is not made in this UE. In other words, even though the system information element 619 including dynamic TDD configuration information (i.e., changed TDD configuration information) is changed to new information, a system information change indicator or SIB change indicator 603 of the paging channel 605, a change tag of the existing system information block, and TDD configuration information or TDD configuration IE 613 of the system are not changed. Therefore, the existing UE that does not support the dynamic TDD system is not affected by the change in dynamic TDD configuration information regardless of whether a paging channel 605 is received or not, or whether the UE is a newly accessing UE. The scheduling information 615 for scheduling of the system information block 619 including changed TDD configuration information is used for the UE capable of recognizing the dynamic TDD configuration information. Thus, in accordance with an embodiment of the present invention, the existing UE is not affected by the change in dynamic TDD configuration information, and the UE capable of recognizing dynamic TDD configuration information can advantageously change the dynamic TDD configuration information to new TDD configuration information every time corresponding to the maximum paging period because it changes the dynamic TDD configuration information without a change in the change tag of the system information block.

In FIG. 6, with regards the time that the UE receives the system information block 619 after a change in TDD configuration information is indicated by the paging channel, the receiving includes both receiving the system information block 619 at the next modification period 507 of the system information, and receiving the system information block 619 at the reception time of the system information block 619, where it is transmitted earliest regardless of the next modification period.

A method of transmitting TDD configuration information (i.e., configuration information of a TDD frame) by an eNB in the TDD wireless communication system according to the embodiment, may be implemented as a method of determining a changed TDD configuration indicating a transmission direction (UL or DL) of a plurality of sub-frames constituting a frame, generating a system information element or TDD reconfiguration IE including changed TDD configuration information indicating the changed TDD configuration, transmitting a TDD configuration change indicator indicating whether TDD configuration information is changed or not, in a paging signal transmitted over a paging channel, generating scheduling information for transmitting a system information block including the system information element or TDD reconfiguration IE, transmitting the scheduling information in the existing system information block, and transmitting system information block including the system information element.

A method of receiving TDD configuration information (i.e., configuration information of a TDD frame) by a UE in the TDD wireless communication system according to the embodiment, may be implemented as a method of receiving a TDD configuration change indicator indicating whether TDD configuration information is changed or not, over a paging channel, receiving from an eNB the existing system information block including scheduling information for reception of a system information block including changed TDD configuration information if the TDD configuration change indicator indicates a change in TDD configuration, receiving a system information element including the changed TDD configuration depending on the scheduling information, and transmitting and receiving the sub-frame depending on the changed TDD configuration.

The system information element or TDD reconfiguration IE includes information that indicates one of the TDD frame configurations defined in, for example, Table 1, or indicates a transmission direction (UL or DL) of each sub-frame. A system information block including the system information element is implemented such that only the UE capable of operating in the dynamic TDD system can recognize the system information element.

Figure 7:
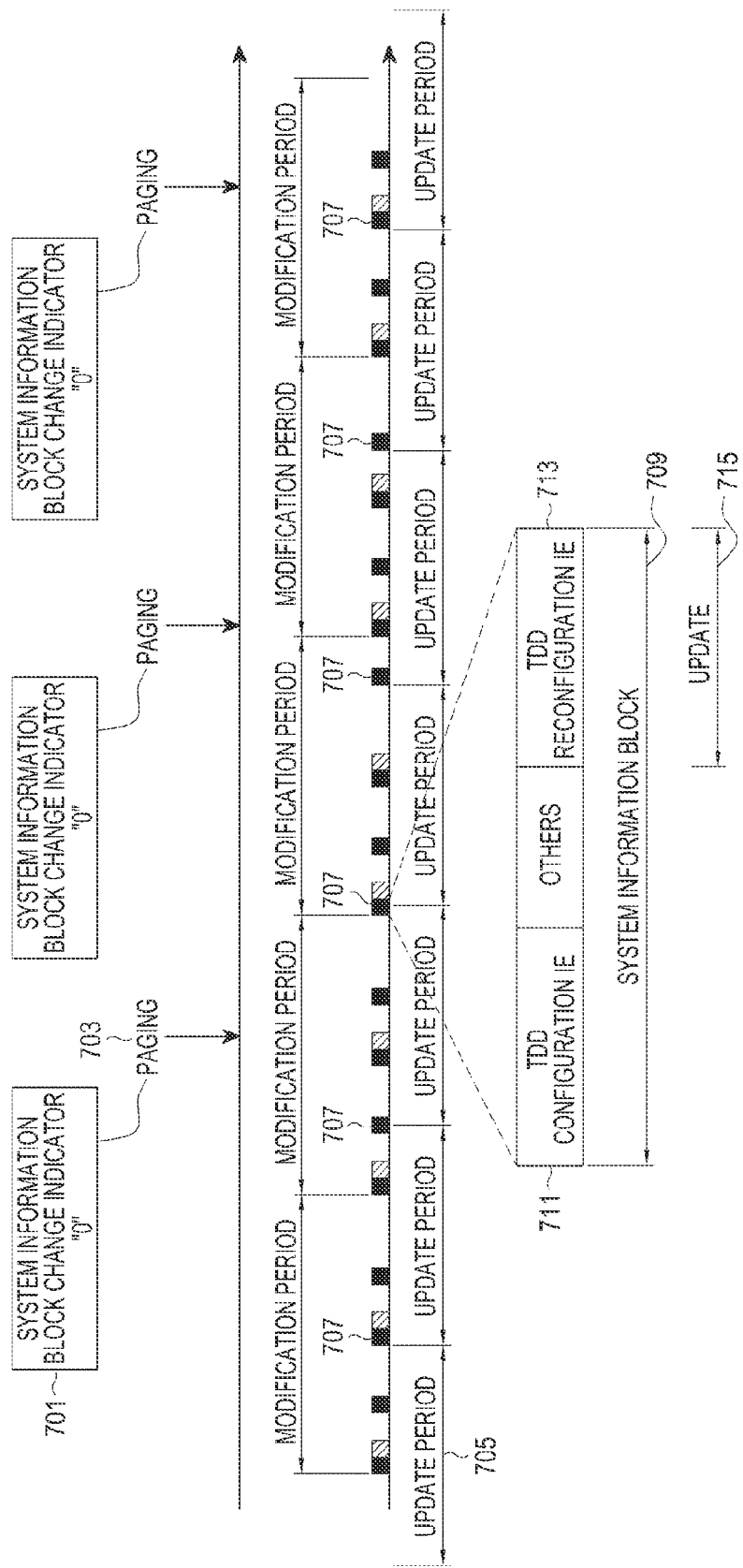
FIG. 7 illustrates a method for changing system information including TDD configuration information according to an embodiment of the present invention.

FIG. 7 illustrates a method for changing system information including TDD configuration information according to an embodiment of the present invention.

In FIG. 7, an eNB transmits a system information change indicator or SIB change indicator 701, indicating whether system information is changed or not, to a UE over a paging channel 703. A change in system information or SIB is indicated by the system information change indicator 701. For example, the system information change indicator 701 indicates the presence of a change in system information if its value is '1', and indicates the absence of a change in system information if its value is '0'.

In FIG. 7, changed TDD configuration information (i.e., dynamic TDD configuration information) includes a system information element or TDD reconfiguration IE 713 that only the UE capable of using or supporting the dynamic TDD system can recognize. The system information element 713 is periodically transmitted in the existing system information block (for example, SIB1) 709.

In the embodiment of FIG. 7, an eNB may indicate or provide information about a dynamic TDD configuration information update period 705 by signaling it to a UE capable of dynamic TDD configuration. Upon receiving the information about the dynamic TDD configuration information update period 705, a UE receives the system information block 709 depending on the dynamic TDD configuration information update period 705 at a time 707, regardless of the system information change indicator 701 that is transmitted over the paging channel 703, and updates 715 only the dynamic TDD configuration information element 713 in the system information from the system information block 709.

Because the UE is not affected by the paging channel, the UE may advantageously adjust an update period of the dynamic TDD configuration information depending on the dynamic TDD configuration information update period 705 indicated by the eNB, and may advantageously change the dynamic TDD configuration information earlier than the transmission period of the paging channel 703. In addition, since TDD configuration information or TDD configuration IE 711 that the existing UE can recognize, and a change tag are not changed despite the change in the dynamic TDD configuration information element 713, a UE incapable of recognizing or supporting the dynamic TDD system is not affected by the dynamically-changed TDD configuration information.

A method of transmitting TDD configuration information (i.e., configuration information of a TDD frame) by an eNB in the TDD wireless communication system according to the embodiment, may be implemented as a method of determining a changed TDD configuration (i.e., dynamic TDD configuration) indicating a transmission direction (UL or DL) of a plurality of sub-frames constituting a frame, generating a system information element or TDD reconfiguration IE including changed TDD configuration information indicating the changed TDD configuration, and periodically transmitting the system information element in the existing system information block.

A method for receiving TDD configuration information by a UE in the TDD wireless communication system according to the embodiment, may be implemented as a method of receiving information about the dynamic TDD configuration information update period 705, periodically receiving the existing system information block based on the information about the dynamic TDD configuration information update period 705, receiving a system information element or TDD reconfiguration IE indicating changed TDD configuration (i.e., dynamic TDD configuration) indicating a transmission direction (UL or DL) of a plurality of sub-frames from the existing system information block, and transmitting and receiving the sub-frames depending on the changed TDD configuration.

The system information element or TDD reconfiguration IE includes information that indicates one of the TDD frame configurations defined in, for example, Table 1, or indicates a transmission direction (UL or DL) of each sub-frame. The system information element can be recognized only by the UE capable of operating in the dynamic TDD system, and is included in the existing system information block, and a UE capable of recognizing this system information element may demodulate the system information element within the existing system information block.

Figure 8:
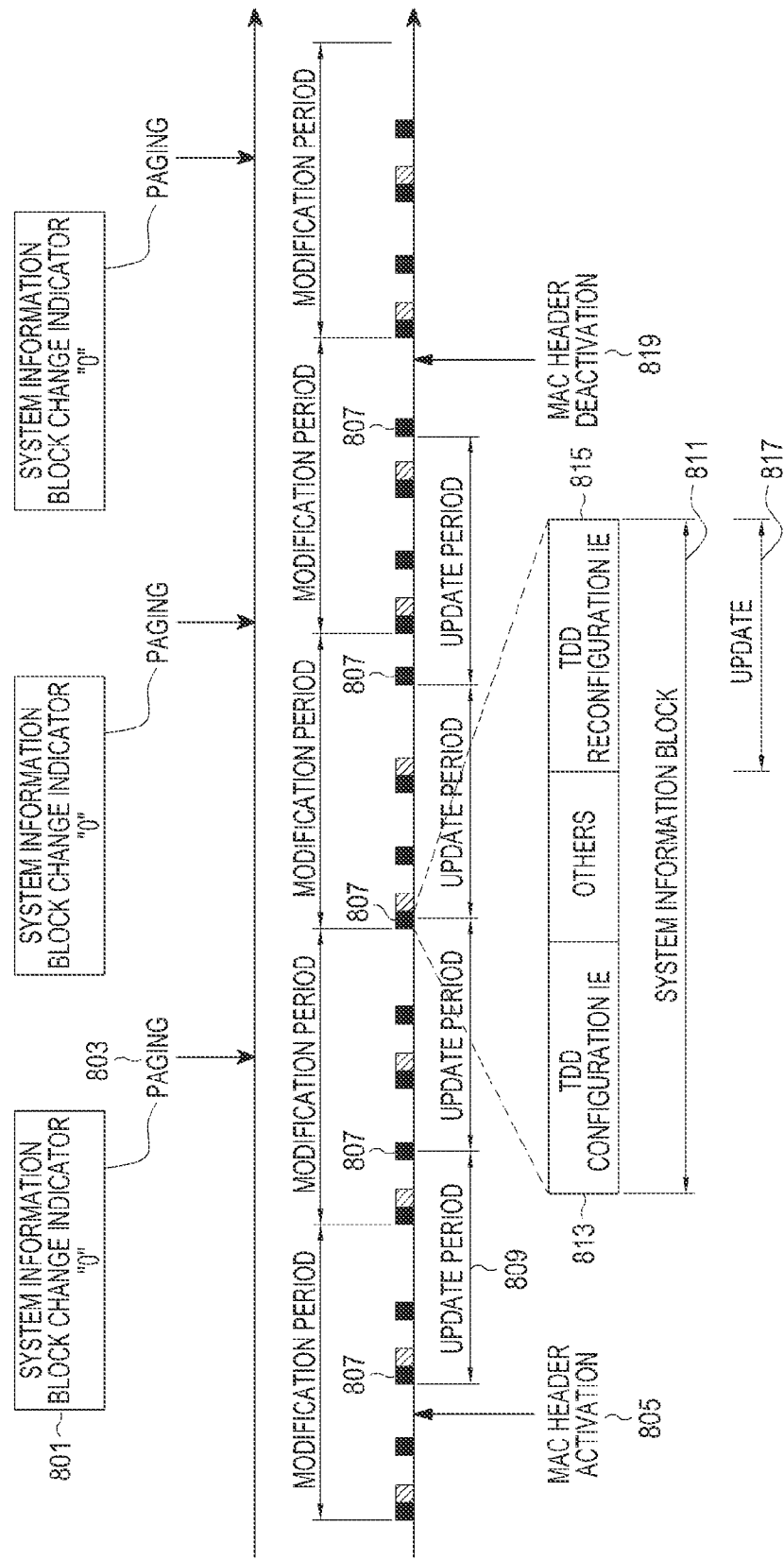
FIG. 8 illustrates a method for changing system information including TDD configuration information according to an embodiment of the present invention.

FIG. 8 illustrates a method for changing system information including TDD configuration information according to an embodiment of the present invention.

Referring to FIG. 8, an eNB transmits a system information change indicator or SIB change indicator 801, indicating whether system information is changed or not, to a UE over a paging channel 803. A change in system information or SIB is indicated by the system information change indicator 801. For example, the system information change indicator 801 indicates the presence of a change in system information if its value is '1', and indicates the absence of a change in system information if its value is '0'. In the embodiment of FIG. 8, changed TDD configuration information (i.e., dynamic TDD configuration information) includes a system information element or TDD reconfiguration IE 815 that only the UE capable of using or supporting the dynamic TDD system can recognize. The system information element 815 is periodically transmitted in the existing system information block (for example, SIB1) 811. An eNB may indicate or provide information about a dynamic TDD configuration information update period 809 to a UE capable of dynamic TDD configuration by signaling. In an alternative embodiment, the system information change indicator 801 may not be transmitted.

Upon receiving the information about the dynamic TDD configuration information update period 809 through signaling with an eNB, a UE may change TDD configuration information regardless of the system information change indicator 801 transmitted over the paging channel 803. If the eNB indicates activation 805 of a change in TDD configuration information using a Media Access Control (MAC) header of a data frame that it transmits to the UE while the UE is not making a change in TDD configuration information at the normal times, the UE receives the system information block 811 depending on the dynamic TDD configuration information update period 809 at time 807. The UE receives only the dynamic TDD configuration information element 815 from the system information block 811 and updates 817 it in the system information. In addition, if the eNB indicates (or informs the UE of) deactivation 805 of a change in TDD configuration information using a MAC header of a data frame, the UE stops the change in TDD configuration information. In addition to indicating the deactivation using the MAC header, the eNB may automatically deactivate a change in TDD configuration information if the same TDD configuration lasts for a predetermined time.

In FIG. 8, since the UE is not affected by the paging channel, the UE may advantageously adjust an update period of the dynamic TDD configuration information depending on the dynamic TDD configuration information update period 807 indicated by the eNB. In addition, the eNB indicates activation/deactivation using a MAC header of a MAC message depending on whether there is a need for a dynamic change in TDD configuration information, thereby making it possible to avoid an unnecessary operation of changing TDD configuration information without transmission of a paging channel. The MAC message may be transmitted over a data channel. In accordance with the embodiment of FIG. 8, the UE may advantageously change the dynamic TDD configuration information earlier than the transmission period of the paging channel.

Because the TDD configuration information 813 that the existing UE incapable of recognizing the dynamic TDD system can recognize, and a change tag are not changed despite the change in the dynamic TDD configuration information element 815, a UE incapable of recognizing the dynamic TDD system may be free from the problem caused by the dynamic change in the TDD configuration information element 815.

A direction (UL or DL) of a sub-frame for dynamic TDD configuration information may be indicated with the use of 4-bit (or 8-bit) information defined in Table 2 below. For example, if 4-bit information is used, the TDD configuration information may be transmitted or changed at intervals of 10 ms or at intervals of a multiple thereof.

TABLE 2

| Information field | Subframe direction |
|---|---|
| 0000 | U U U U |
| 0001 | U U U D |
| 0010 | (Reserved) |
| 0011 | U U D D |
| 0100 | U D U U |
| 0101 | U D U D |
| 0110 | (Reserved) |
| 0111 | U D D D |
| 1000-1011 | (Reserved) |
| 1100 | D D U U |
| 1101 | D D U D |
| 1110 | (Reserved) |
| 1111 | D D D D |

In Table 2, each 4-bit information in an information field may indicate a transmission direction (UL or DL) of a sub-frame. If the 4-bit information is transmitted twice, transmission directions of a total of 8 sub-frames except for, for example, sub-frames #0 and #5 (See Table 1), which are fixed to a DL, may be indicated in a radio frame using 8-bit information. In this case, a change in TDD configuration may be made in units of 10 ms. The bit information in Table 2 may be included in a system information element (or TDD reconfiguration IE), or in a system information block including dynamic TDD configuration information. The number of bits of the bit information in Table 2 is merely illustrative, and may be any number of bits.

Table 3 below illustrates an example of directly indicating a TDD configuration index instead of the transmission direction (UL or DL) of a sub-frame using, for example, 3-bit information. Each bit information in Table 3 indicates one TDD configuration, and may be construed as a direction of a sub-frame like in Table 1. The bit information may be included in a system information element (or TDD reconfiguration IE), or in a system information block including dynamic TDD configuration information.

TABLE 3

| Information field | TDD configuration | Equivalent subframe direction (D0, D1, D2, D3) |
|---|---|---|
| 000 | 0 | U U U U |
| 001 | 1 | U D U D |
| 010 | 2 | D D U D |
| 011 | 3 | U U D D |
| 100 | 4 | U D D D |
| 101 | 5 | D D D D |
| 110 | 6 | U U U U |
| 111 | (Reserved) | — |

In the embodiment of FIG. 8, activation/deactivation of a change in TDD configuration information (or system information) may be indicated using a MAC header of a data frame.

Figure 9:
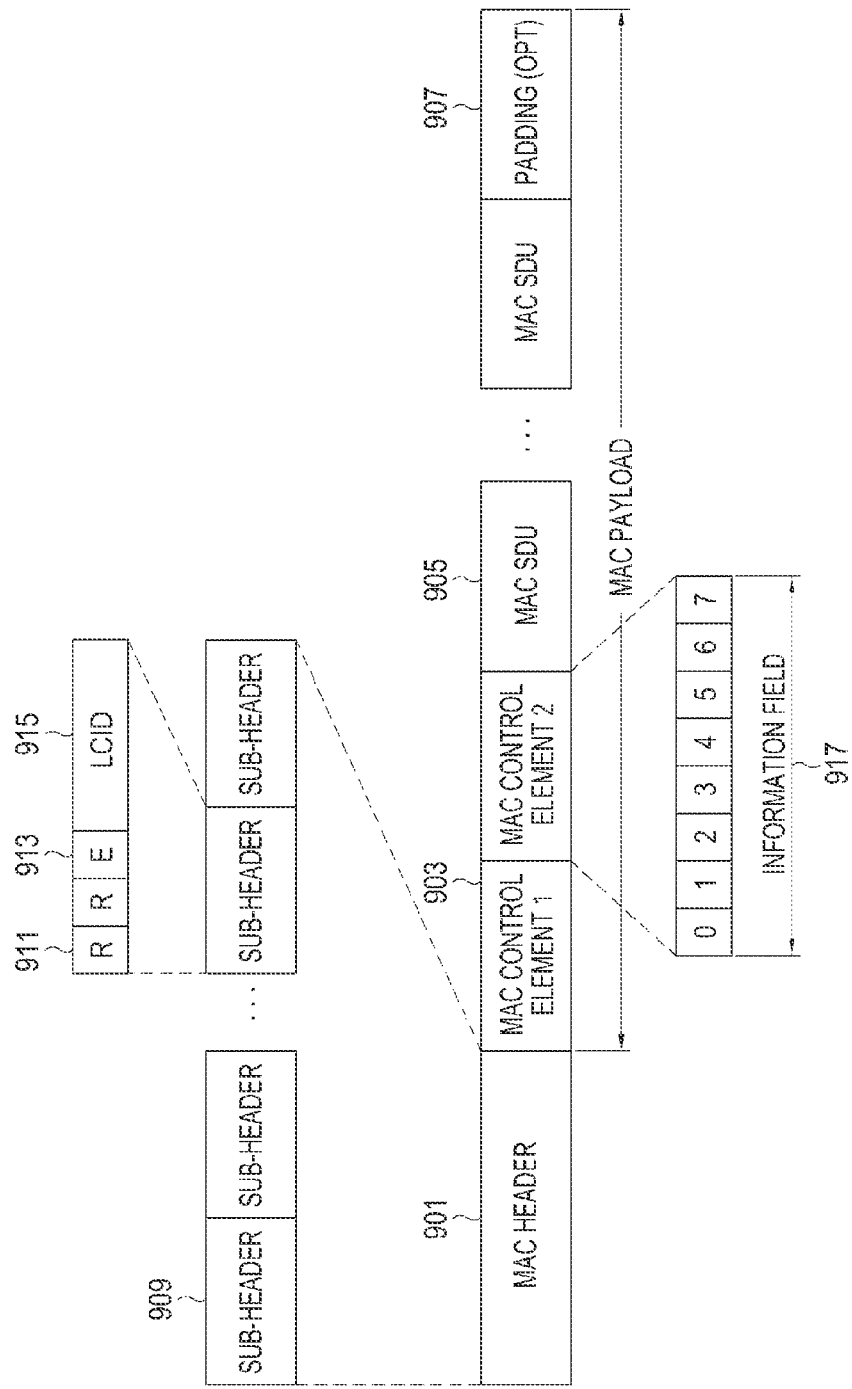
FIG. 9 illustrates a structure of a MAC message according to an embodiment of the present invention.

FIG. 9 illustrates a structure of a MAC message according to an embodiment of the present invention. Specifically, FIG. 9 illustrates a structure of the MAC message that is transmitted over a data channel as illustrated in FIG. 8.

Referring to FIG. 9, a MAC message includes a MAC header 901 and a MAC payload 917. The MAC header 901 includes a plurality of sub-headers 909. Each sub-header 909 includes an R field(s) 911, an E field 913, and a Logical Channel IDentifier (LCID) field 915. The R field 911 is a reserved field, the E field 913 is an extended field, and the LCID field 915 is a logical channel ID field including an ID for identifying the type of the sub-header 909.

The LCID is comprised of different 5-bit information in a UL and a DL. Depending on the order and number of the sub-headers 909 existing in the MAC header 901, their associated MAC control elements 903 follow the MAC header 901. The MAC control elements 903 are followed by MAC Service Data Units (SDUs) 905 and padding 907. During transmission of the MAC message, information transmitted to a MAC layer is included in the sub-headers 909, and MAC information for the sub-headers 909 is included in their associated MAC control elements 903. The location of the MAC control element 903 including the information indicating activation/deactivation of a change in TDD configuration information according to the embodiment of FIG. 8, may be indicated to the UE in the MAC header 901 using the LCID field 915 as defined in Table 4 below. Table 4 illustrates an example of indicating a location (for example, an index '11010') of the MAC control element 903 using the LCID field 915.

TABLE 4

| Index | LCID for DL-SCH |
|---|---|
| 00000 | CCCH |
| 00001-01010 | Identity of the logical channel |
| 01011-11001 | Reserved |
| 11010 | TDD reconfiguration activation/deactivation |
| 11011 | Activation/deactivation |
| 11100 | UE contention resolution identity |
| 11101 | Timing advance command |
| 11110 | DRX command |
| 11111 | Padding |

In the embodiment of FIG. 9, the MAC control element 903 includes information indicating activation/deactivation of a change in TDD configuration, and represents information that indicates the activation/deactivation using, for example, 1-byte information.

Reference will now be made to FIGS. 10 to 13 to describe an operation and structure according to the embodiment of the present invention.

Figure 10:
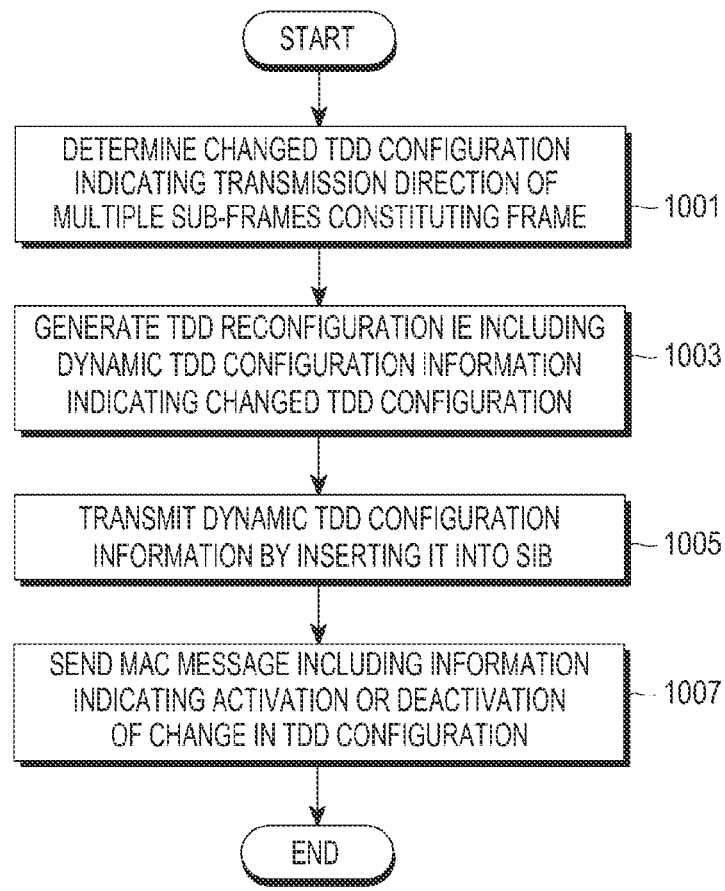
FIG. 10 is a flowchart illustrating a method for transmitting system information including TDD configuration information by an eNB according to an embodiment of the present invention.

FIG. 10 is a flowchart illustrating a method for transmitting system information including TDD configuration information by an eNB according to an embodiment of the present invention.

Referring to FIG. 10, in step 1001, the eNB determines changed TDD configuration indicating a transmission direction (UL or DL) of a plurality of sub-frames constituting a frame. In step 1003, the eNB generates a system information element or TDD reconfiguration IE including changed TDD configuration information indicating the changed TDD configuration. In step 1005, the eNB transmits the changed TDD configuration information by inserting it into the existing system information block or SIB. In step 1007, the eNB sends a MAC message including information indicating activation/deactivation of the change in TDD configuration.

Figure 11:
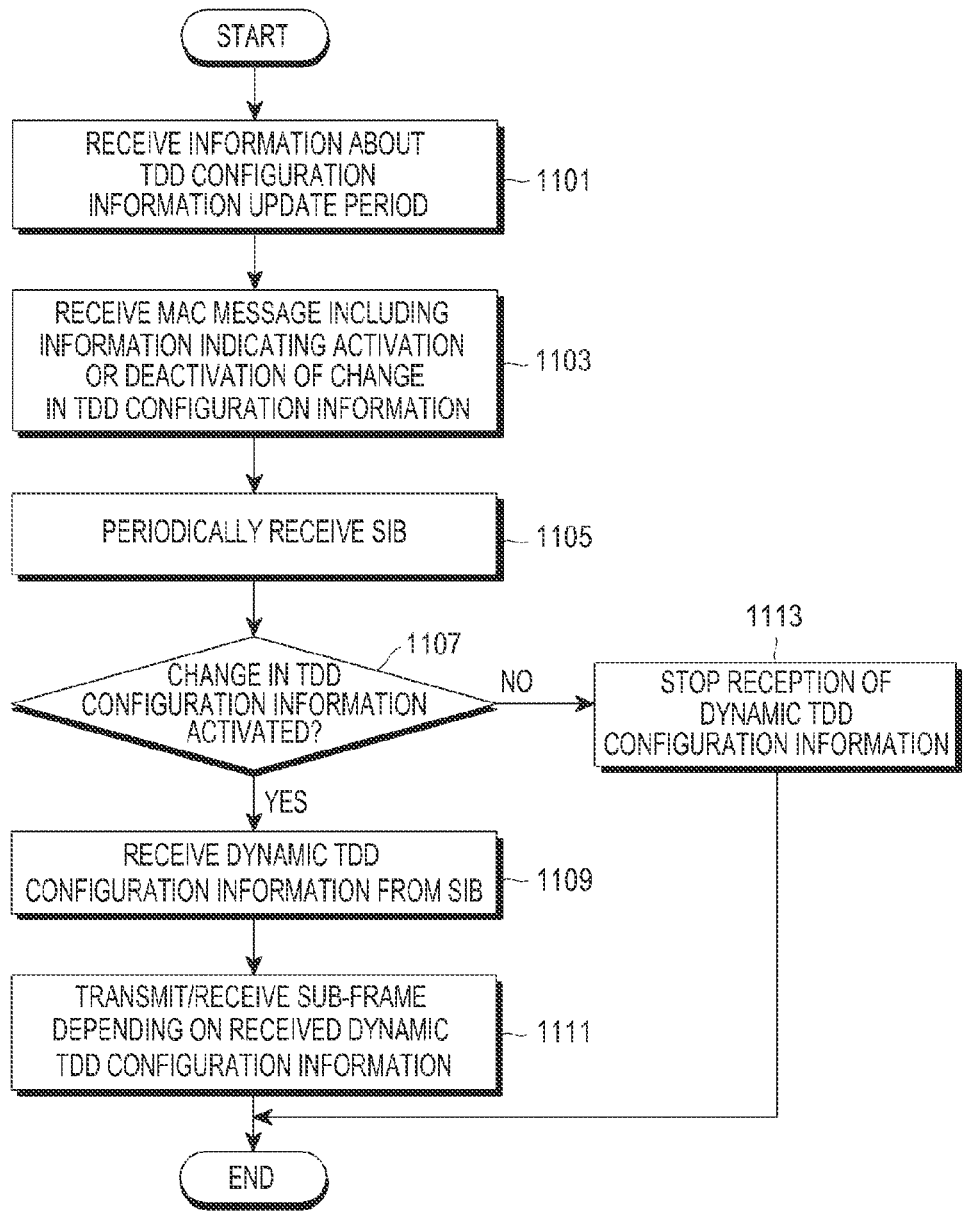
FIG. 11 is a flowchart illustrating a method for receiving system information including TDD configuration information by a UE according to an embodiment of the present invention.

FIG. 11 is a flowchart illustrating a method for receiving system information, including TDD configuration information, by a UE according to an embodiment of the present invention.

Referring to FIG. 11, in step 1101, the UE receives information about a TDD configuration information update period from an eNB. In step 1103, the UE receives, from the eNB, a MAC message including information indicating activation/deactivation of a change in TDD configuration information. In step 1105, the UE periodically receives a system information block. In step 1107, the UE determines, from the MAC message, whether a change in TDD configuration information is activated or deactivated. If the change in TDD configuration information is activated, the UE receives dynamic TDD configuration information from the system information block in step 1109, and transmits and receives sub-frames depending on the dynamic TDD configuration information in step 1111. On the contrary, if the change in TDD configuration information is deactivated in step 1107, the UE stops the operation of receiving the dynamic TDD configuration information from the system information block in step 1113.

In FIGS. 10 and 11, the system information element or TDD reconfiguration IE includes information that indicates one of the TDD frame configurations defined in, for example, Table 1, or indicates a transmission direction (UL or DL) of each sub-frame. The system information element may be recognized only by the UE capable of operating in the dynamic TDD system, and is transmitted in the existing system information block. The UE may demodulate the system information element within the existing system information block. As in the embodiment of FIG. 9, a MAC header of the MAC message has an LCID field, which may be recognized only by the UE capable of operating in the dynamic TDD system.

If the indication is made using the MAC information, the UE may advantageously recognize a change in TDD configuration information earlier than the reception time of system information without receiving the system information. Since the MAC information is transmitted together with a data channel, the eNB may recognize the change in TDD configuration information at the UE based on a response channel to the transmitted data channel. Since the system information is transmitted over a broadcast channel, the eNB may not determine whether or not the UE has successfully received the system information.

Figure 12:
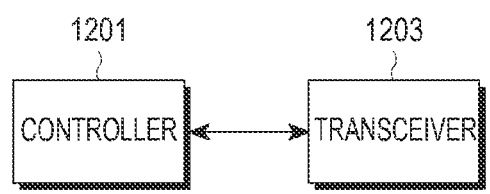
FIG. 12 is a block diagram illustrating a structure of an eNB according to an embodiment of the present invention.

FIG. 12 is a block diagram illustrating a structure of an eNB according to an embodiment of the present invention.

Referring to FIG. 12, the eNB includes a controller 1201 configured to control an operation of determining changed TDD configuration indicating a transmission direction (UL or DL) of sub-frames, configuring a system information block including a system information element including changed TDD configuration information indicating the changed TDD configuration, and generating a MAC message including information indicating activation/deactivation of a change in TDD configuration, and a transceiver 1203 for transmitting, under control of the controller 1201, the system information block and the MAC message to the wireless network, and transmitting and receiving sub-frames depending on the changed TDD configuration. The controller 1201 may also control the transceiver 1203 to send a paging message indicating whether the system information element or TDD configuration information is changed or not.

Figure 13:
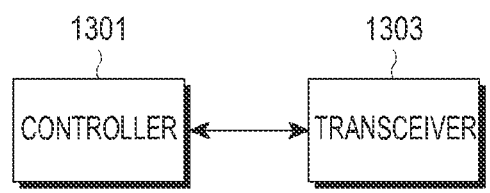
FIG. 13 is a block diagram illustrating a structure of a UE according to an embodiment of the present invention.

FIG. 13 is a block diagram illustrating a structure of a UE according to an embodiment of the present invention.

Referring to FIG. 13, the UE includes a controller 1301 configured to control an operation of receiving information about TDD configuration information update period, receiving a MAC message including information indicating activation/deactivation of a change in TDD configuration information, periodically receiving a system information block, receiving (or stop receiving) a system information element or dynamic TDD configuration information from the system information block based on the information included in the MAC message, and transmitting and receiving sub-frames depending on the dynamic TDD configuration information, and a transceiver 1303 for receiving, under control of the controller 1301, the system information block and the MAC message from the wireless network, and transmitting and receiving the sub-frames. The controller 1301 may also control the transceiver 1303 to receive a paging message indicating whether the system information element is changed or not.

The device structures in FIGS. 12 and 13 may be applied not only to the embodiment of FIG. 8, but also to all other embodiments.

As is apparent from the foregoing description, in the TDD wireless communication system according to embodiments of the present invention, the eNB may adaptively change TDD configuration in response to a change in dynamic data traffic between a UL and a DL of its cell.

The TDD system, dynamically changes TDD configuration using a system information block according to embodiments of the present invention, may operate both a UE incapable of recognizing dynamic change in TDD configuration and a UE capable of recognizing the dynamic change in TDD configuration, and may transmit, to the UE, dynamic TDD configuration information that is transmitted in the existing system information block and is different from TDD configuration information.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for transmitting Time Division Duplexing (TDD) configuration information by an evolved Node B (eNB) in a TDD wireless communication system, the method comprising:
   determining, by the eNB, a changed TDD configuration indicating a transmission direction of a plurality of sub-frames constituting a frame;
   generating a system information element including dynamic TDD configuration information indicating the changed TDD configuration;
   transmitting a system information block including the dynamic TDD configuration information; and sending a Media Access Control (MAC) message including information indicating whether or not a change in TDD configuration is activated, wherein the information indicating whether or not the change in the TDD configuration is activated is indicated by a Logical Channel Identifier (LCID) field included in a MAC header of the MAC message.

2. The method of claim 1, wherein the system information block including the dynamic TDD configuration information is periodically transmitted.

3. The method of claim 1, further comprising signaling information about an update period of the dynamic TDD configuration information to a User Equipment (UE) supporting a dynamic TDD system.

4. The method of claim 1, wherein the dynamic TDD configuration information is only recognizable by a UE supporting a dynamic TDD system.

5. An evolved Node B (eNB) for transmitting Time Division Duplexing (TDD) configuration information in a TDD wireless communication system, the eNB comprising:

a transceiver configured to transmit and receive TDD configuration-related information and a frame; and a controller configured to determine a changed TDD configuration indicating a transmission direction of a plurality of sub-frames constituting the frame, generate a system information element including dynamic TDD configuration information indicating the changed TDD configuration, transmit a system information block including the dynamic TDD configuration information, and send a Media Access Control (MAC) message including information indicating whether a change in TDD configuration is activated, wherein the information indicating whether or not the change in the TDD configuration is activated is indicated by a Logical Channel Identifier (LCID) field included in a MAC header of the MAC message.

6. The eNB of claim 5, wherein the controller is configured to control periodic transmission of the system information block including the dynamic TDD configuration information.

7. The eNB of claim 5, wherein the controller is configured to control an operation of signaling information about an update period of the dynamic TDD configuration information to a User Equipment (UE) supporting a dynamic TDD system.

8. The eNB of claim 5, wherein the dynamic TDD configuration information is only recognizable by a UE supporting a dynamic TDD system.

9. A method for receiving Time Division Duplexing (TDD) configuration information by a User Equipment (UE) in a TDD wireless communication system, the method comprising:

receiving, from an evolved Node B (eNB), a Media Access Control (MAC) message including information indicating whether a change in a TDD configuration is activated;

receiving a system information block including dynamic TDD configuration information; and receiving the dynamic TDD configuration information from the system information block, if the information in the MAC message indicates activation of the change in the TDD configuration, wherein the information indicating whether the change in the TDD configuration is activated is indicated by a Logical Channel Identifier (LCID) field included in a MAC header of the MAC message.

10. The method of claim 9, further comprising receiving information about a TDD configuration information update period from the eNB.

11. The method of claim 9, further comprising stopping the operation of receiving the dynamic TDD configuration information from the system information block if the information in the MAC message indicates deactivation of the change in TDD configuration.

12. The method of claim 9, wherein the dynamic TDD configuration information is only recognizable by a UE supporting a dynamic TDD system.

13. A User Equipment (UE) for receiving Time Division Duplexing (TDD) configuration information in a TDD wireless communication system, comprising:

a transceiver configured to transmit and receive TDD configuration-related information and a frame; and a controller configured to receive, from an evolved Node B (eNB):

a Media Access Control (MAC) message including information indicating whether a change in a TDD configuration is activated, a system information block including dynamic TDD configuration information, and the dynamic TDD configuration information from the system information block, if the information in the MAC message indicates activation of the change in TDD configuration, wherein the information indicating whether the change in the TDD configuration is activated is indicated by a Logical Channel Identifier (LCID) field included in a MAC header of the MAC message.

14. The UE of claim 13, wherein the controller is configured to control the transceiver to receive information about a TDD configuration information update period from the eNB.

15. The UE of claim 13, wherein the controller is configured to stop the operation of receiving the dynamic TDD configuration information from the system information block if the information in the MAC message indicates deactivation of the change in TDD configuration.

16. The UE of claim 13, wherein the dynamic TDD configuration information is only recognizable by a UE supporting a dynamic TDD system.

* * * * *